United States Patent
Yu et al.

(10) Patent No.: US 12,101,114 B2
(45) Date of Patent: Sep. 24, 2024

(54) MULTI-BAND HYPERBOLIC FREQUENCY MODULATION SPREAD SPECTRUM COMMUNICATION METHOD BASED ON CROSS SUB-BAND DIVISION

(71) Applicant: SOUTH CHINA UNIVERSITY OF TECHNOLOGY, Guangzhou (CN)

(72) Inventors: Hua Yu, Guangzhou (CN); Yaqi Zhang, Guangzhou (CN); Fei Ji, Guangzhou (CN); Fangjiong Chen, Guangzhou (CN)

(73) Assignee: SOUTH CHINA UNIVERSITY OF TECHNOLOGY, Guangzhou (CN)

( * ) Notice: Subject to any disclaimer, the term of this patent is extended or adjusted under 35 U.S.C. 154(b) by 117 days.

(21) Appl. No.: 18/009,338

(22) PCT Filed: Oct. 30, 2020

(86) PCT No.: PCT/CN2020/125523
§ 371 (c)(1),
(2) Date: Mar. 21, 2023

(87) PCT Pub. No.: WO2021/248784
PCT Pub. Date: Dec. 16, 2021

(65) Prior Publication Data
US 2023/0239002 A1 Jul. 27, 2023

(30) Foreign Application Priority Data
Jun. 9, 2020 (CN) .......................... 202010043963.5

(51) Int. Cl.
*H04B 1/69* (2011.01)
*H04B 13/02* (2006.01)

(52) U.S. Cl.
CPC .............. *H04B 1/69* (2013.01); *H04B 13/02* (2013.01)

(58) Field of Classification Search
CPC .................................. H04B 1/69; H04B 13/02
See application file for complete search history.

(56) References Cited

U.S. PATENT DOCUMENTS

| 9,369,866 B2 * | 6/2016 | Moradi ............. H04L 27/26416 |
| 2005/0111588 A1 * | 5/2005 | Green ................... H04B 13/02 367/6 |

(Continued)

FOREIGN PATENT DOCUMENTS

| CN | 102170314 | 8/2011 |
| CN | 106899357 | 6/2017 |

(Continued)

OTHER PUBLICATIONS

Yanbo Zhao, "Parameter Estimation and Applications for Wideband Underwater Acoustic Channels", China Doctoral Dissertations Full Text Database, with English abstract, May 15, 2017, pp. 1-160.

(Continued)

*Primary Examiner* — Jaison Joseph
(74) *Attorney, Agent, or Firm* — JCIPRNET

(57) ABSTRACT

The present invention discloses is a multi-band hyperbolic frequency modulation spread spectrum communication method based on cross sub-band division. In the present solution, multi-band division of different sub-band quantities is performed on an available bandwidth of an underwater acoustic system according to the parity of the serial number of the current spread spectrum period to achieve the aim of cross sub-band division. On this basis, a plurality of divided sub-bands are grouped in pairs; for each group, sub-band selection is performed according to different transmitted data by using a sub-band selection and activation method to realize multi-band parallel transmission. Meanwhile, in each spread spectrum period, an activated sub-band performs frequency modulation on a modulated signal by (Continued)

using rising and falling hyperbolic frequency modulation signals respectively.

12 Claims, 4 Drawing Sheets

(56) References Cited

U.S. PATENT DOCUMENTS

| | | | | |
|---|---|---|---|---|
| 2017/0005690 | A1* | 1/2017 | Gregory | H04B 1/40 |
| 2020/0284763 | A1* | 9/2020 | Lamothe | G01N 29/022 |
| 2020/0366382 | A1* | 11/2020 | Yu | H04L 27/14 |
| 2021/0072367 | A1* | 3/2021 | Solodky | H01Q 21/0025 |

FOREIGN PATENT DOCUMENTS

| | | |
|---|---|---|
| CN | 107947868 | 4/2018 |
| CN | 111478720 | 7/2020 |

OTHER PUBLICATIONS

Lan Zhanga et al., "HFM Spread Spectrum Modulation Scheme in Shallow Water Acoustic Channels", 2012 Oceans, Oct. 19, 2012, pp. 1-6.

"International Search Report (Form PCT/ISA/210) of PCT/CN2020/125523," mailed on Feb. 10, 2021, with English translation thereof, pp. 1-5.

* cited by examiner

MULTI-BAND HYPERBOLIC FREQUENCY MODULATION SPREAD SPECTRUM COMMUNICATION METHOD BASED ON CROSS SUB-BAND DIVISION

CROSS-REFERENCE TO RELATED APPLICATION

This application is a 371 of international application of PCT application serial no. PCT/CN2020/125523, filed on Oct. 30, 2020, which claims the priority benefit of China application no. 202010043963.5, filed on Jun. 9, 2020. The entirety of each of the above mentioned patent applications is hereby incorporated by reference herein and made a part of this specification.

TECHNICAL FIELD

The present invention relates to the field of underwater acoustic communications, and in particular, to a spread spectrum communication method by combining a cross sub-band with rising and falling HFM signals.

BACKGROUND

Due to the complexity of the marine environment, the underwater acoustic channel has severe multi-path effects and time-varying characteristics. However, seawater medium has severe attenuation to high frequency, resulting in very small bandwidth available for underwater acoustic communication. Underwater acoustic communication has experienced the development from incoherent technology to coherent technology. Compared with incoherent technology, coherent technology has high spectrum utilization rate and can greatly improve the efficiency of communication system. However, severe multi-path effects and time-varying characteristics are the main limiting factors for underwater acoustic coherent communication, and it is difficult to ensure the reliability of communication in an environment with low signal-to-noise ratio.

A spread spectrum (SS) technology is a technology capable of effectively combating interference, which, due to its own advantages, can still realize reliable information transmission on the premise of ensuring a certain communication rate in the case of a low signal-to-noise ratio and a complex channel with multi-path spread. There are mainly three common spread spectrum modes, i.e., Direct Sequence Spread Spectrum (DSSS), Frequency Hopping Spread Spectrum (FHSS) and Chirp Spread Spectrum (CSS), etc. In the present invention, a hyperbolic frequency modulation signal is selected as a spread spectrum signal. Hyperbolic frequency modulation, as a spread spectrum communication mode suitable for underwater acoustic communication, has unique advantages.

In order to facilitate the understanding of the subsequent algorithm, the hyperbolic frequency modulation signal model is as follows:

A hyperbolic frequency modulation (HFM) signal can be defined as $$x(t) = A(t)\cos\left(\frac{2\pi}{\beta}\ln(1+\beta f_b t)\right), 0 \le t \le T$$

wherein, $f_b$ represents the frequency of the start point of the HFM signal, $f_e$ represents the frequency of the cut-off point of the HFM signal, $B=|f_e-f_b|$ represents the bandwidth (frequency modulation interval), T represents the duration period of the HFM signal, and $$\beta = \frac{f_b - f_e}{Tf_b f_e}$$

represents the chirp rate. In particular, if $f_e > f_b$, it is referred to as raising frequency, and at this time, the frequency modulation $\beta < 0$; if $f_e < f_b$, it is referred to as falling frequency, and at this time, the frequency modulation $\beta > 0$. The instantaneous frequency of the HFM signal is, $$f(t) = \frac{\partial(\beta^{-1}\ln(1+\beta f_b t))}{\partial t} = \frac{1}{\beta t + f_b^{-1}}$$

The instantaneous frequency is a hyperbolic function varying with time t, so the signal is called hyperbolic frequency modulation signal. The hyperbolic signal has good pulse compressibility and Doppler tolerance. The pulse compressibility thereof can present a pulse with sharp main lobe and rapid decline of side lobe after a received signal is correlated with a local HFM signal, and therefore has good anti-noise performance. Meanwhile, in a signal transmission process, because high-speed relative motion of a transmitting end and a receiving end may cause a severe Doppler scale effect, a signal may be compressed or extended in time. After a signal experiences a Doppler scaling effect, a pulse may still be formed better after the signal processed by a matched filter at a receiving end, and it is considered that the signal has Doppler tolerance.

It is assumed that a HFM signal produces a scale transform of size a. The corresponding received HFM signal may be expressed as $$r(t) = x(\alpha t) = A(\alpha t)\cos\left(\frac{2\pi}{\beta}\ln(1+\beta f_b \alpha t)\right)$$

After the scale change occurs, the instantaneous frequency of the signal becomes $$f_\alpha(t) = \frac{\partial(\beta^{-1}\ln(1+\beta f_b \alpha t))}{\partial t} = \frac{\alpha}{\beta \alpha t + f_b^{-1}}$$

Here we can find a suitable $\Delta t$, such that $f_\alpha(t-\Delta t)=f(t)$, i.e., $$\frac{\alpha}{\beta\alpha(t-\Delta t) + f_b^{-1}} = \frac{1}{\beta t + f_b^{-1}}$$

$$\Delta t = \frac{1-\alpha}{\alpha\beta f_b}$$

It can be determined therefrom that the delay $\Delta t$ is a constant determined by a scale factor and independent of time. That is, after an HFM signal experiences a Doppler effect, compared with that before a scale change does not occur, an instantaneous frequency of the HFM signal is only shifted on a time axis, so that after matched filtering is performed at the receiving end, a better pulse can still be formed, and only a position of the pulse will be shifted by Δt. Therefore, the HFM signal has Doppler tolerance.

In addition, for multi-sequence spread spectrum communications, orthogonality between the sequences is important. Meanwhile, the duration length of the sequence must exceed the maximum delay of the channel, so as to ensure the orthogonality of the received signal sequence as far as possible.

Although the use of the HFM for spread spectrum communications can enhance the anti-interference capability and the anti-Doppler effect, a relatively serious problem faced is that the frequency band utilization rate is relatively low. In addition, if a maximum delay of a channel exceeds a spreading period, the orthogonality of the received signal sequence will be affected. In order to alleviate the above two situations to a certain extent, improving the frequency band utilization rate of an HFM spread spectrum communication and a tolerance degree of the maximum delay of the channel are worth studying problems.

The present invention provides a multi-band hyperbolic frequency modulation spread spectrum communication method based on cross sub-band division, which is based on the described signal model and background.

SUMMARY

For a general HFM spread spectrum communication method, the available bandwidth of the system is only used for a single HFM frequency modulation signal, and therefore the utilization rate of the frequency band of the system is very low. In addition, the general solution of underwater acoustic spread spectrum communication is usually designed based on the principle that a single spread spectrum period exceeds the channel delay. However, when the maximum channel delay exceeds the spread spectrum period, the orthogonality of the sequence at receiving end may be affected to some extent, thereby increasing the interference between adjacent symbols. For this purpose, the present invention proposes a novel spread spectrum communication solution, i.e., a multi-band hyperbolic frequency modulation spread spectrum communication method based on cross sub-band division.

The objective of the present invention is to propose a novel spread spectrum communication solution based on an HFM signal. By dividing the available bandwidth of the underwater acoustic communication system into different numbers of sub-bands according to the parity of the serial number of a spread spectrum period, thereby reducing interference between adjacent symbols, and improving the tolerance of a communication signal to a channel delay. In addition, a sub-band selection activation method and a QPSK modulation method are adopted, thereby realizing multi-band parallel transmission and improving frequency band utilization. Furthermore, within a frequency modulation period, the activated sub-bands respectively use raising and falling HFM signals as frequency modulation signals to perform spectrum spreading on the modulated QPSK symbols.

In order to solve the described technical problem, the present invention adopts the following technical solutions.

A multi-band hyperbolic frequency modulation spread spectrum communication method based on cross sub-band division, comprising the following steps:

S1. dividing a bandwidth of a communication system into several sub-bands of different quantities according to parity of a serial number of a spread spectrum period;

S2. performing, by the sub-bands, frequency modulation on a modulated signal by using corresponding rising and falling hyperbolic frequency modulation signals respectively;

S3. grouping data and sub-bands, performing sub-band selection and symbol mapping according to transmitted data, and performing signal modulation and spectrum spreading; and S4. adding a frame header and a guard interval to the spread-spectrum transmission signal so as to generate a signal frame.

Further, in the step S1, a spread spectrum period with an serial number of the spread spectrum period being an odd number divides the bandwidth used by the system into $K_1$ sub-bands, and a spread spectrum period with an serial number of the spread spectrum period being an even number divides the used bandwidth into $K_2$ sub-bands, and then hyperbolic frequency modulation is respectively performed $K_1$ sub-band and $K_2$ sub-bands respectively, thereby increasing the frequency band utilization rate.

Further, in the step S2, in each spread spectrum period, and in each sub-band, the hyperbolic frequency modulation is performed using two kinds of weakly correlated spread spectrum signals generated with the rising and falling HFM signals respectively.

Further, the rising HFM signal $x_k^+[n]$ corresponding to each sub-band is expressed as $$x_k^+[n] = \begin{cases} \cos\left(\frac{2\pi}{\beta_{k1}^+}\ln\left(1+\beta_{k1}^+f_{k1b}^+\frac{n}{f_s}\right)\right) \cdot p \text{ is an odd number} \\ \cos\left(\frac{2\pi}{\beta_{k2}^+}\ln\left(1+\beta_{k2}^+f_{k2b}^+\frac{n}{f_s}\right)\right) p \text{ is an even number} \end{cases}$$

wherein p is a serial number of a spread spectrum period, and when p is an odd number or an even number, the modulation frequencies are:

$$\beta_{k1}^+ = \frac{-B}{f_{k1b}^+f_{k1e}^+K_1T_H}, \beta_{k2}^+ = \frac{-B}{f_{k2b}^+f_{k2e}^+K_2T_H};$$

when p is an odd number, the start frequency and the cut-off frequency of a k-th sub-band are respectively $$f_{k1b}^+ = f_0 + (k-1)\frac{B}{K_1}, f_{k1e}^+ = f_0 + k\frac{B}{K_1};$$

when p is an even number, the start frequency and the cut-off frequency of the k-th sub-band are respectively $$f_{k2b}^+ = f_0 + (k-1)\frac{B}{K_2}, f_{k2e}^+ = f_0 + k\frac{B}{K_2}.$$

by the same reasoning, the falling HFM signal $x_k^-[n]$ corresponding to each sub-band is expressed as:

$$x_k^-[n] = \begin{cases} \cos\left(\frac{2\pi}{\beta_{k1}^-}\ln\left(1+\beta_{k1}^-f_{k1b}^-\frac{n}{f_s}\right)\right) p \text{ is an odd number} \\ \cos\left(\frac{2\pi}{\beta_{k2}^-}\ln\left(1+\beta_{k2}^-f_{k2b}^-\frac{n}{f_s}\right)\right) p \text{ is an even number} \end{cases}$$

wherein p is the serial number of the spread spectrum period, and when p is an odd number or an even number, the modulation frequencies are:

$$\beta_{k1}^- = \frac{B}{f_{k1b}^- f_{k1e}^- K_1 T_H}, \beta_{k2}^- = \frac{B}{f_{k2b}^- f_{k2e}^- K_2 T_H};$$

when p is an odd number, the start frequency and the cut-off frequency of the k-th sub-band are respectively $$f_{k1b}^- = f_1 - (k-1)\frac{B}{K_1}, f_{k1e}^- = f_1 - k\frac{B}{K_1};$$

when p is an even number, the start frequency and the cut-off frequency of the k-th sub-band are respectively $$f_{k2b}^- = f_1 - (k-1)\frac{B}{K_2}, f_{k2e}^- = f_1 - k\frac{B}{K_2}.$$

Further, in the step S3, grouping the data and sub-bands specifically comprises:

dividing every three bits of the bits to be transmitted into one group; with respect to the odd-number-th spectrum spread period, dividing every two adjacent sub-bands of $K_1$ sub-bands into one group to obtain a total of $K_1/2$ groups and each group carrying the three-bit group; and with respect to the even-number-th spectrum spread period, dividing every two adjacent sub-bands of the $K_2$ sub-bands into one group to obtain a total of $K_2/2$ groups and each group carrying the three-bit group, a result of grouping in the present solution being that every two sub-bands of each group transmit three bits.

Further, in the step S3, performing sub-band selection and symbol mapping according to transmitted data and performing signal modulation and spread spectrum specifically comprises:

each sub-band group transmits three bits, and a first bit is used for a selection of sub-band; when the first bit is 0, the first sub-band in the sub-band group is selected for spread spectrum transmission, and when the first bit is 1, the second sub-band in the sub-band group is selected for spread spectrum transmission, second and third bits are used for QPSK symbol mapping, and the sub-band activated by the first bit performs corresponding spread spectrum transmission.

Further, in the step S4, a frame header uses rising and falling HFM signals and zero interval that occupy the entire communication frequency band, and a guard interval uses a falling HFM signal and a zero symbol that occupy the entire communication frequency band to form an interval.

Compared with the prior art, the present invention achieves the beneficial effects as follows: using a solution of cross-sub-band division, improving the tolerance for the maximum channel delay; different information is carried and transmitted by means of the weak correlation of the rising and falling hyperbolic frequency modulation signals; and a multi-band parallel transmission solution based on QPSK modulation is used to further improve the frequency band utilization rate and transmission rate of the system.

DETAILED DESCRIPTION OF EMBODIMENTS

To make the objective, technical solutions, and advantages of the present invention clearer and more comprehensible, the following further describes the present invention in detail with reference to the accompanying drawings and embodiments. The meanings of the signs are as follows:

$f_0$: represents a start frequency of a communication frequency band, and $f_0=9$ KHz is taken in the present embodiment.

$f_1$: represents a cut-off frequency of a communication frequency band, $f_1=15$ KHz is taken in the present embodiment.

B: represents a bandwidth, B=6 KHz is taken in the present embodiment.

$T_H$: represents the symbol period of a hyperbolic frequency modulation signal, $T_H=20.48$ ms is taken in the present embodiment.

$T_G$: represents a symbol guard interval.

$T_L$: represents a frame header duration.

$f_s$: represents a sampling rate of a hyperbolic frequency modulation signal, $f_s=100$ KHz is taken in the present embodiment.

N: represents the number of sampling points of a spread spectrum period of the hyperbolic frequency modulation signal, $N=T_H*f_s$, N=2048 is taken in the present embodiment.

$K_1$: represents the number of sub-bands of the odd-number-th spectrum spread period, $K_1=4$ is taken in the present embodiment.

$K_2$: represents the number of sub-bands of the even-number-th spectrum spread period, $K_2=2$ is taken in the present embodiment.

M: represents the number of spectrum spread period included in each frame of data, M=10 is taken in the present embodiment.

$f_{kb}$: represents a start frequency of the k-th sub-band, and is further divided into four cases: raising frequency and falling frequency, the serial number of an odd symbol period, and the serial number of an even symbol period.

$f_{kz}$: represents a cut-off frequency of the k-th sub-band, and is further divided into four cases: raising frequency and falling frequency, the serial number of an odd symbol period, and the serial number of an even symbol period.

$\beta_k^+$: represents a frequency modulation of the raising HFM signal of the k-th sub-band, and is further divided into two cases: the serial number of an odd symbol period, and the serial number of an even symbol period.

$\beta_k^-$: represents a frequency modulation of the falling HFM signal of the k-th sub-band, and is further divided into two cases: the serial number of an odd symbol period, and the serial number of an even symbol period.

Figure 1:
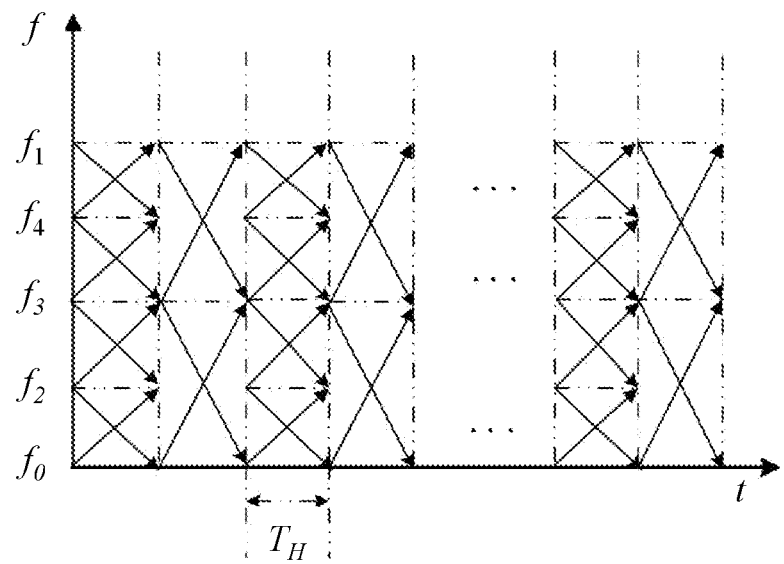
FIG. 1 is a frequency modulation diagram of a hyperbolic underwater acoustic frequency modulation spread spectrum communication solution by combining a cross sub-band with raising and falling HFM signals.

The present embodiment relates to a hyperbolic frequency modulation spread spectrum communication method by combining a cross sub-band with raising and falling HFM signals, comprising the following steps:

S1. sub-band division. Dividing a system bandwidth into several sub-bands of different quantities according to the parity of the serial number of a spread spectrum period. For a system with a start frequency of $f_0$, a cut-off frequency of $f_1$, and a bandwidth of $B=f_1-f_0$ in a communication frequency band, the bandwidth of the system is divided into two cases: divided into $K_1$ and $K_2$ sub-bands, $K_1$ and $K_2$ is an integral multiple of 2, and $K_1 \neq K_2$. Among them, the $K_1$ sub-band is used for a spread spectrum period with the serial number of the spread spectrum frequency modulation being an odd number, and the $K_2$ sub-band is used for a spread spectrum period with an serial number of the spread spectrum frequency modulation being an even number, and all the spread spectrum periods are $T_H$. The sampling rate is set to be $f_s$, the number of sampling points of a spread spectrum period is N, and each frame of data includes M HFM spread spectrum periods. The cross sub-band division manner in the present embodiment is shown in FIG. 1.

S2, generating a sub-band HFM signal. Performing frequency modulation for the sub-bands by using corresponding rising and falling hyperbolic frequency modulation signals respectively. The rising HFM signal $x_k^+[n]$ corresponding to each sub-band is expressed as $$x_k^+[n] = \begin{cases} \cos\left(\frac{2\pi}{\beta_{k1}^+}\ln\left(1+\beta_{k1}^+ f_{k1b}^+ \frac{n}{f_s}\right)\right), & p \text{ is an odd number} \\ \cos\left(\frac{2\pi}{\beta_{k2}^+}\ln\left(1+\beta_{k2}^+ f_{k2b}^+ \frac{n}{f_s}\right)\right) & p \text{ is an even number} \end{cases}$$

wherein p is the serial number of a spread spectrum period, and n represents the n-th sampling point within the spread spectrum period; and when p is an odd number or an even number, the modulation frequencies are respectively $$\beta_{k1}^+ = \frac{-B}{f_{k1b}^+ f_{k1e}^+ K_1 T_H}, \beta_{k2}^+ = \frac{-B}{f_{k2b}^+ f_{k2e}^+ K_2 T_H};$$

when p is an odd number, the start frequency and the cut-off frequency of the k-th sub-band are respectively $$f_{k1b}^+ = f_0 + (k-1)\frac{B}{K_1}, f_{k1e}^+ = f_0 + k\frac{B}{K_1};$$

when p is an even number, the start frequency and the cut-off frequency of the k-th sub-band are respectively $$f_{k2b}^+ = f_0 + (k-1)\frac{B}{K_2}, f_{k2e}^+ = f_0 + k\frac{B}{K_2}.$$

by the same reasoning, the falling HFM signal $x_k^-[n]$ corresponding to each sub-band is expressed as:

$$x_k^-[n] = \begin{cases} \cos\left(\frac{2\pi}{\beta_{k1}^-}\ln\left(1+\beta_{k1}^- f_{k1b}^- \frac{n}{f_s}\right)\right) p \text{ is an odd number} \\ \cos\left(\frac{2\pi}{\beta_{k2}^-}\ln\left(1+\beta_{k2}^- f_{k2b}^- \frac{n}{f_s}\right)\right) p \text{ is an even number} \end{cases}$$

wherein p is the serial number of a spread spectrum period, and when p is an odd number or an even number, the modulation frequencies are respectively:

$$\beta_{k1}^- = \frac{B}{f_{k1b}^- f_{k1e}^- K_1 T_H}, \beta_{k2}^- = \frac{B}{f_{k2b}^- f_{k2e}^- K_2 T_H};$$

when p is an odd number, the start frequency and the cut-off frequency of the k-th sub-band are respectively $$f_{k1b}^- = f_1 - (k-1)\frac{B}{K_1}, f_{k1e}^- = f_1 - k\frac{B}{K_1};$$

when P is an even number, the start frequency and the cut-off frequency of the k-th sub-band are respectively $$f_{k2b}^- = f_1 - (k-1)\frac{B}{K_2}, f_{k2e}^- = f_1 - k\frac{B}{K_2}.$$

The generation mode of sub-band HFM signals in the communication solution of the present embodiment is shown in FIG. 1, wherein the up-right arrow represents frequency raising, and the down-right arrow represents frequency falling; and $f_2$, $f_3$ and $f_4$ represent the start frequency and the cut-off frequency of each sub-band after the communication bandwidth of $B=f_1-f_0$ is divided into four sub-bands.

S3. Signal modulation. Grouping data and sub-bands, performing sub-band selection and symbol mapping according to transmitted data, and performing signal modulation and spectrum spreading. Each three bits of the bits to be transmitted are grouped into one group. with respect to the odd-number-th spectrum spread period, dividing every two adjacent sub-bands of $K_1$ sub-bands into one group to obtain a total of $K_1/2$ groups; and with respect to the even-number-th spectrum spread period, dividing every two adjacent sub-bands of the $K_2$ sub-bands into one group to obtain a total of $K_2/2$ groups, and each sub-band group carrying the aforementioned 3-bit group. The grouping result in the present solution is that each group has two sub-bands, and three bits are carried.

Figure 2:
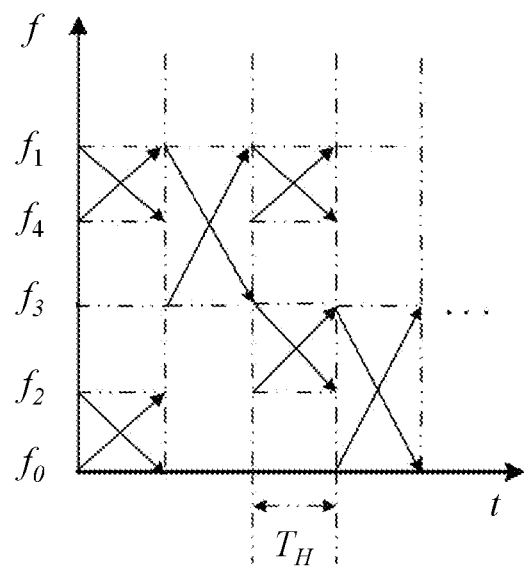
FIG. 2 is a schematic diagram of sub-band selection corresponding to an example.

The first bit is used for sub-band selection; when the first bit is 0, the first sub-band of the sub-band group is selected for spread spectrum transmission, and when the first bit is 1, the second sub-band of the sub-band group is selected for spread spectrum transmission. It is assumed that a transmitted random bit stream is 001110100101111010 . . . , and every three bits form a group, i.e., 001 110 100 101 111 010 . . . , and a first bit (a bit with an underline) of each group is used for sub-band selection, and then activated sub-bands are shown in FIG. 2. That is, the first bit in the first group of bits is 0, and therefore the first sub-band group of the first spread spectrum period selects the first sub-band; the first bit in the second group of bits is 1, and therefore the second sub-band group of the first spread spectrum period selects the second sub-band; the first bit in the third group of bits is 1, and therefore the first sub-band group of the second spread spectrum period selects the second sub-band, and meanwhile, the spread spectrum period only has one sub-band group, and subsequent bits will be modulated to the next spread spectrum period; and the rest of the bit groups is performed by analogy.

Figure 3:
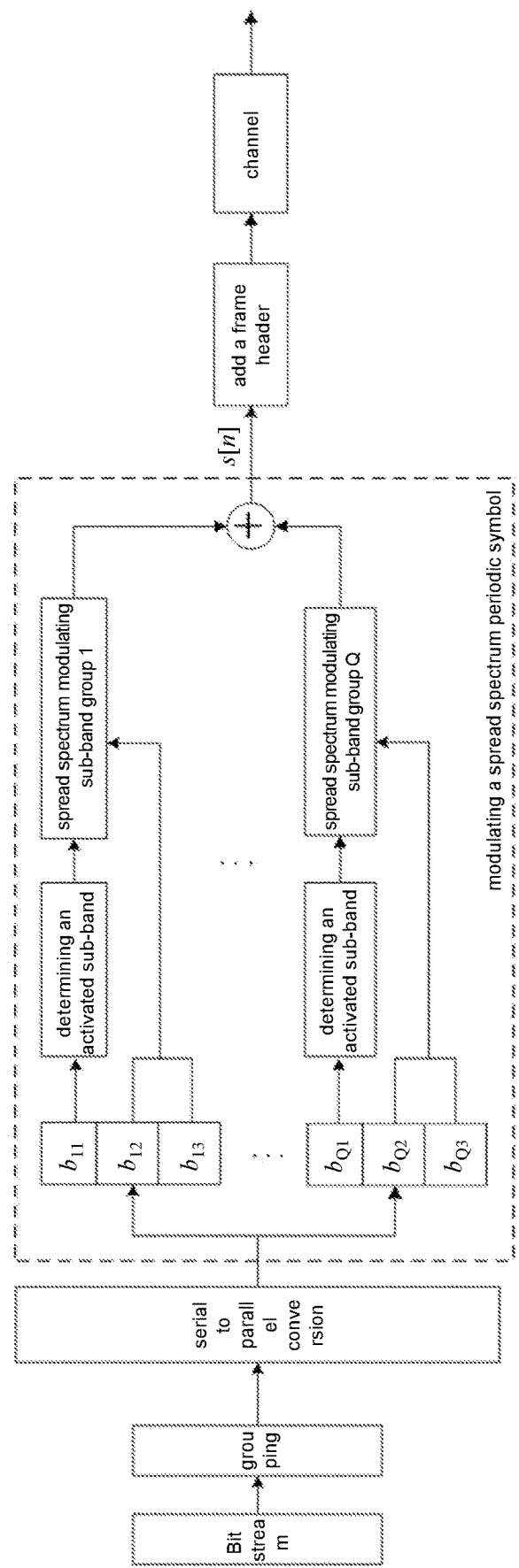
FIG. 3 is a flowchart of frequency modulation spread spectrum modulation at the transmitting end in the communication solution of the present invention.

The second and third bits are used for QPSK symbol mapping, and the sub-band activated by the first bit performs corresponding spread spectrum transmission.

denoting the three bits of the q-th group to be $b_{q1}b_{q2}b_{q3}$, then the transmission signal of the current multi-band hyperbolic frequency modulation spread spectrum symbol is expressed as:

$$s[n] = \sum_{q=1}^{Q}\left(\text{Re}\{e^{j\theta_q}x_{k_q}^+[n]\} + \text{Im}\{e^{j\theta_q}x_{k_q}^-[n]\}\right)$$

$$\theta_q = \begin{cases} \frac{\pi}{4}, & b_{q2}b_{q3} = 00 \\ \frac{3\pi}{4}, & b_{q2}b_{q3} = 01 \\ \frac{5\pi}{4}, & b_{q2}b_{q3} = 11 \\ \frac{7\pi}{4}, & b_{q2}b_{q3} = 10 \end{cases}$$

wherein Q is the number of sub-band groups of the current spread spectrum period; in the odd-number-th spread spectrum period, $Q=K_1/2$; in the even-number-th spread spectrum period, $Q=K_2/2$; $k_q=2q+b_{q1}-1$ is the serial number of sub-bands activated in the q-th group; and in the above formula, $$s[n] = \sum_{q=1}^{Q}\left(\text{Re}\{e^{j\theta_q}x_{k_q}^+[n]\} + \text{Im}\{e^{j\theta_q}x_{k_q}^-[n]\}\right)$$

$$\theta_q = \begin{cases} \frac{\pi}{4}, & b_{q2}b_{q3} = 00 \\ \frac{3\pi}{4}, & b_{q2}b_{q3} = 01 \\ \frac{5\pi}{4}, & b_{q2}b_{q3} = 11 \\ \frac{7\pi}{4}, & b_{q2}b_{q3} = 10 \end{cases}$$

represents that the second and third bits of the q-th group are mapped by using QPSK symbols, wherein j is an imaginary unit. The specific modulation process is shown in FIG. 3.

Figure 4:
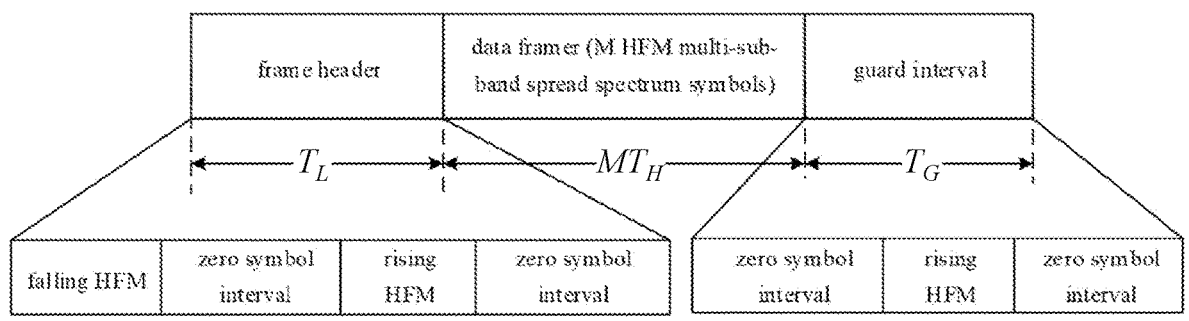
FIG. 4 is a structural diagram of a transmitted signal frame.

S4: generating a signal frame. a frame header uses rising and falling HFM signals and a zero interval that occupy the entire communication frequency band for synchronous detection, and a guard interval uses a falling HFM signal and a zero symbol that occupy the entire communication frequency band to form an interval. The structure of the transmitted signal frame is shown in FIG. 4.

S5: Receiving synchronization. After a signal is band-pass filtered at a receiving end, synchronization and channel estimation are performed by using raising or falling HFM signals that occupy an entire communication frequency band. It is assumed that the result of the channel estimation is: there are L multi-path, and the parameters corresponding to the $l(1, \ldots, L)$-th path are the amplitude of $\hat{A}_l$, the delay of $\hat{\tau}_l$ and the Doppler factor of $\hat{\alpha}_l$. Calculating a peak value offset of each path respectively according to the channel parameters. For the current spread spectrum period in a data frame, the peak value offset $\Delta n_{k,l}$ of the $l(1, \ldots, L)$-th path is:

$$\Delta n_{k,l} = \left\lfloor \hat{\tau}_l f_s + \left(\frac{1-\hat{\alpha}_l}{\hat{\alpha}_l \beta_k f_{kb}}\right) \right\rfloor \quad l = 1, \ldots, L$$

wherein, $$\frac{1-\hat{\alpha}_l}{\hat{\alpha}_l \beta_k f_{kb}}$$

is an offset caused by Doppler spread; $\beta_k$ is a frequency modulation of the k-th sub-band, and $f_{kb}$ represents a start frequency of the k-th sub-band. It is required to determine corresponding values of $\beta_k$ and $f_{kb}$ according to the frequency raising or frequency falling as well as the parity of the serial number of the current spread spectrum period, specifically as defined in S2.

S6. Correlation operation. Respectively performing a cross-correlation operation on a received signal and a raised HFM spread spectrum symbol of each sub-band, and obtaining a peak value at a corresponding point after the correlation operation according to a peak value offset $\Delta n_{k,l}$. The peak value $I_{k,l}^+$ of the k-th sub-band and the l-th path is expressed as $$I_{k,l}^+ = \sum_{n=0}^{N-1} x_k^+[n] r[n + \Delta n_{k,l}]$$

Among them, r[n] represents the current spread spectrum periodic symbol in the data frame. By the same reasoning, after a cross-correlation operation is performed on a received signal and a fall HFM spread spectrum symbol of a sub-band, a peak value $I_{k,l}^-$ is expressed as $$I_{k,l}^- = \sum_{n=0}^{N-1} x_k^-[n] r[n + \Delta n_{k,l}]$$

S7. Determining an activated sub-band. Determining an activated sub-band according to the peak values $I_{k,l}^+$ and $I_{k,l}^-$. The decision rule for activating the sub-bands for the q-th sub-band group of the current spread spectrum period in the data frame is as follows:

If $$\sum_{l=1}^{L}\left(|I_{q_f,l}^+| + |I_{q_f,l}^-|\right) \geq \sum_{l=1}^{L}\left(|I_{q_s,l}^+| + |I_{q_s,l}^-|\right),$$

it is considered that the first sub-band of the q-th sub-band group is the activated sub-band, and according to the activation solution in S3, it is determined that the first bit transmitted by the q-th sub-band group is $\hat{b}_{q1}=0$.

If $$\sum_{l=1}^{L}\left(|I_{q_f,l}^+| + |I_{q_f,l}^-|\right) < \sum_{l=1}^{L}\left(|I_{q_s,l}^+| + |I_{q_s,l}^-|\right),$$

it is considered that the second sub-band of the q-th sub-band group is the activated sub-band, and according to the activation solution in S3, it is determined that the first bit transmitted by the q-th sub-band group is $\hat{b}_{q1}=1$.

Among them, $q_f=2q-1$ denotes the first sub-band of the q sub-band group, and $q_s=2q$ denotes the second sub-band of the q sub-band group. In the odd-number-th spread spectrum period, the values of $q_f$ and $q_s$ is taken between $1, \ldots K_1$, and in the even-number-th spread spectrum period, the values of $q_f$ and $q_s$ is taken between $1, \ldots, K_2$.

Figure 5:
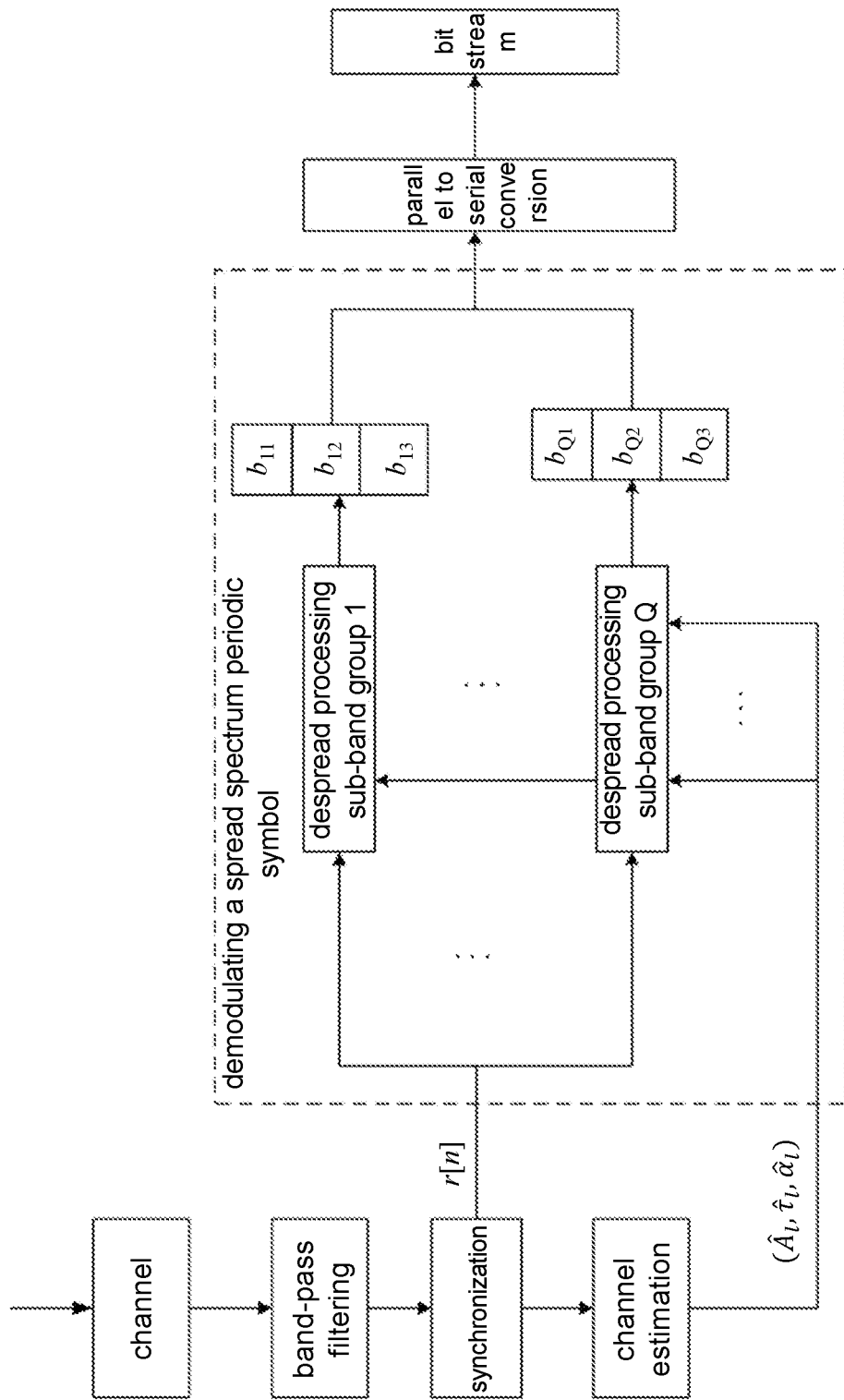
FIG. 5 is a flowchart of the demodulation and despreading at the receiving end in the communication solution of the present invention.

S8: Performing symbol demodulation on the activated sub-band. According to the detection result in S7, it can be determined that the serial number of the activated sub-band is k, and symbol demodulation is performed on the sub-band. By using a criterion of maximal ratio combining, performing combined processing on a peak value of L paths and performing symbol judgment, in which a demodulated symbol is $$S = \sum_{l=1}^{L} \hat{A}_l^* (I_{k,l}^+ + jI_{k,l}^-),$$

wherein j is an imaginary unit, and $\hat{A}_l^*$ represents a conjugate of an amplitude $\hat{A}_l$ corresponding to the $l(1, \ldots, L)$-th path. Then, according to S, demapping the QPSK symbol to obtain $b_{q2}b_{q3}$, finally obtaining the three bits $b_{q1}b_{2}b_{q3}$ transmitted by the sub-band group. The demodulation process of each subgroup of each spread spectrum periodic frame in the data frame is shown in FIG. 5.

What is claimed is:

1. A multi-band hyperbolic frequency modulation spread spectrum communication method based on cross sub-band division, comprising following steps:
   step S1, dividing a bandwidth of a communication system into several sub-bands of different quantities according to parity of a serial number of a spread spectrum period;
   step S2, performing frequency modulation for the sub-bands by using corresponding rising and falling hyperbolic frequency modulation (HFM) signals respectively;
   step S3, grouping data and the sub-bands, performing sub-band selection and symbol mapping according to the data, and performing signal modulation and spectrum spreading according to the data and the sub-bands to obtain a spread-spectrum transmission signal; and
   step S4, adding a frame header and a guard interval to the spread-spectrum transmission signal so as to generate a signal frame.

2. The multi-band hyperbolic frequency modulation spread spectrum communication method based on cross sub-band division of claim 1, wherein in the step S1, a spread spectrum period with a serial number of the spread spectrum period being an odd number divides the bandwidth used by the communication system into $K_1$ sub-bands, and a spread spectrum period with a serial number of the spread spectrum period being an even number divides the used bandwidth into $K_2$ sub-bands, and then hyperbolic frequency modulation is performed for $K_1$ sub-bands and $K_2$ sub-bands respectively.

3. The multi-band hyperbolic frequency modulation spread spectrum communication method based on cross sub-band division of claim 1, wherein in the step S2, in each of the spread spectrum periods, and in each of the sub-bands, hyperbolic frequency modulation is performed using two kinds of weakly correlated spread spectrum signals generated with the rising and falling HFM signals respectively.

4. The multi-band hyperbolic frequency modulation spread spectrum communication method based on cross sub-band division of claim 3, wherein the rising HFM signal $x_k^+[n]$ corresponding to each of the sub-bands is expressed as $$x_k^+[n] = \begin{cases} \cos\left(\frac{2\pi}{\beta_{k1}^+}\ln\left(1 + \beta_{k1}^+ f_{k1b}^+ \frac{n}{f_s}\right)\right), & p \text{ is an odd number} \\ \cos\left(\frac{2\pi}{\beta_{k2}^+}\ln\left(1 + \beta_{k2}^+ f_{k2b}^+ \frac{n}{f_s}\right)\right), & p \text{ is an even number} \end{cases}$$

wherein p is a serial number of a spread spectrum period, and when p is an odd number or an even number, modulation frequencies are:

$$\beta_{k1}^+ = \frac{-B}{f_{k1b}^+ f_{k1e}^+ K_1 T_H}, \beta_{k2}^+ = \frac{-B}{f_{k2b}^+ f_{k2e}^+ K_2 T_H};$$

when p is an odd number, a start frequency and a cut-off frequency of a k-th sub-band are respectively $$f_{k1b}^+ = f_0 + (k-1)\frac{B}{K_1}, f_{k1e}^+ = f_0 + k\frac{B}{K_1};$$

when p is an even number, the start frequency and the cut-off frequency of the k-th sub-band are respectively $$f_{k2b}^+ = f_0 + (k-1)\frac{B}{K_2}, f_{k2e}^+ = f_0 + k\frac{B}{K_2},$$

wherein the falling HFM signal $x_k^-[n]$ corresponding to each of the sub-bands is expressed as:

$$x_k^-[n] = \begin{cases} \cos\left(\frac{2\pi}{\beta_{k1}^-}\ln\left(1 + \beta_{k1}^- f_{k1b}^- \frac{n}{f_s}\right)\right), & p \text{ is an odd number} \\ \cos\left(\frac{2\pi}{\beta_{k2}^-}\ln\left(1 + \beta_{k2}^- f_{k2b}^- \frac{n}{f_s}\right)\right), & p \text{ is an even number} \end{cases}$$

wherein p is the serial number of the spread spectrum period, and when p is the odd number or the even number, the modulation frequencies are:

$$\beta_{k1}^- = \frac{B}{f_{k1b}^- f_{k1e}^- K_1 T_H}, \beta_{k2}^- = \frac{B}{f_{k2b}^- f_{k2e}^- K_2 T_H};$$

when p is the odd number, the start frequency and the cut-off frequency of the k-th sub-band are respectively $$f_{k1b}^- = f_1 - (k-1)\frac{B}{K_1}, f_{k1e}^- = f_1 - k\frac{B}{K_1};$$

when p is the even number, the start frequency and the cut-off frequency of the k-th sub-band are respectively $$f_{k2b}^- = f_1 - (k-1)\frac{B}{K_2}, f_{k2e}^- = f_1 - k\frac{B}{K_2}.$$

5. The multi-band hyperbolic frequency modulation spread spectrum communication method based on cross sub-band division of claim 1, wherein in the step S3, grouping the data and the sub-bands comprises:
   dividing every three bits of bits to be transmitted into one group; with respect to an odd-number-th spectrum spread period, dividing every two adjacent sub-bands of the $K_1$ sub-bands into one group to obtain a total of $K_1/2$ groups and each of the groups carrying the three-bit group; and with respect to an even-number-th spectrum spread period, dividing every two adjacent sub-bands of the $K_2$ sub-bands into one group to obtain a total of $K_2/2$ groups and each of the groups carrying the three-bit group, such that every two sub-bands in each of the groups transmit three bits.

6. The multi-band hyperbolic frequency modulation spread spectrum communication method based on cross sub-band division of claim 1, wherein in the step S3, performing sub-band selection and symbol mapping according to transmitted data and performing signal modulation and spectrum spreading according to the data and the sub-bands to obtain a spread spectrum transmission signal, comprises:

each sub-band group transmits three bits, and a first bit of the three bits is used for a selection of sub-band; when the first bit is 0, a first sub-band in the sub-band group is selected for spread spectrum transmission, and when the first bit is 1, a second sub-band in the sub-band group is selected for the spread spectrum transmission, second and third bits of the three bits are used for quadrature phase shift keying (QPSK) symbol mapping, and a sub-band activated selected by the first bit performs corresponding spread spectrum transmission.

7. The multi-band hyperbolic frequency modulation spread spectrum communication method based on cross sub-band division of claim 1, wherein in the step S4, the frame header uses rising and falling HFM signals and zero interval that occupy an entire communication frequency band, and a guard interval uses a falling HFM signal and a zero symbol that occupy the entire communication frequency band to form an interval.

8. The multi-band hyperbolic frequency modulation spread spectrum communication method based on cross sub-band division of claim 2, wherein in the step S4, the frame header uses rising and falling HFM signals and zero interval that occupy an entire communication frequency band, and a guard interval uses a falling HFM signal and a zero symbol that occupy the entire communication frequency band to form an interval.

9. The multi-band hyperbolic frequency modulation spread spectrum communication method based on cross sub-band division of claim 3, wherein in the step S4, the frame header uses rising and falling HFM signals and zero interval that occupy an entire communication frequency band, and a guard interval uses a falling HFM signal and a zero symbol that occupy the entire communication frequency band to form an interval.

10. The multi-band hyperbolic frequency modulation spread spectrum communication method based on cross sub-band division of claim 4, wherein in the step S4, the frame header uses rising and falling HFM signals and zero interval that occupy an entire communication frequency band, and a guard interval uses a falling HFM signal and a zero symbol that occupy the entire communication frequency band to form an interval.

11. The multi-band hyperbolic frequency modulation spread spectrum communication method based on cross sub-band division of claim 5, wherein in the step S4, the frame header uses rising and falling HFM signals and zero interval that occupy an entire communication frequency band, and a guard interval uses a falling HFM signal and a zero symbol that occupy the entire communication frequency band to form an interval.

12. The multi-band hyperbolic frequency modulation spread spectrum communication method based on cross sub-band division of claim 6, wherein in the step S4, the frame header uses rising and falling HFM signals and zero interval that occupy an entire communication frequency band, and a guard interval uses a falling HFM signal and a zero symbol that occupy the entire communication frequency band to form an interval.

* * * * *